United States Patent [19]
Lunn

[11] 3,752,560
[45] Aug. 14, 1973

[54] MICROSCOPES INCORPORATING INCIDENT-LIGHT DARK GROUND ILLUMINATION SYSTEMS

[75] Inventor: Alick Thompson Lunn, York, England

[73] Assignee: Vickers Limited, London, England

[22] Filed: Dec. 28, 1971

[21] Appl. No.: 213,134

[30] Foreign Application Priority Data
Jan. 1, 1971 Great Britain.......................... 150/71

[52] U.S. Cl...................... 350/91, 350/89, 350/236
[51] Int. Cl. ............................................ G02b 21/08
[58] Field of Search......................... 350/91, 89, 236

[56] References Cited
UNITED STATES PATENTS
1,943,510 1/1934 Bauersfeld et al.................... 350/89
3,297,391 1/1967 Benford et al....................... 350/91
FOREIGN PATENTS OR APPLICATIONS
2,021,784 11/1970 Germany.............................. 350/91

Primary Examiner—David H. Rubin
Attorney—Dean S. Edmonds et al.

[57] ABSTRACT

An incident-light dark ground illumination system for a microscope includes an optical element having at one side an inlet region through which an axially directed light beam is admitted so as to be reflected by a first reflecting surface, at an opposite side of the element, towards a second reflecting surface which surrounds the inlet region and reflects the light back again so that it leaves the element as an output beam surrounding the first reflecting surface. A reflector device having a transparent central area, for transmitting light from an objective to an eyepiece of the microscope, and a non-transmitting peripheral reflecting area surrounding the central area, receives the output beam obliquely so as to produce therefrom an annular reflected beam for delivery to an annular input face of an apertured microscope condenser.

14 Claims, 3 Drawing Figures

PATENTED AUG 14 1973 3,752,560
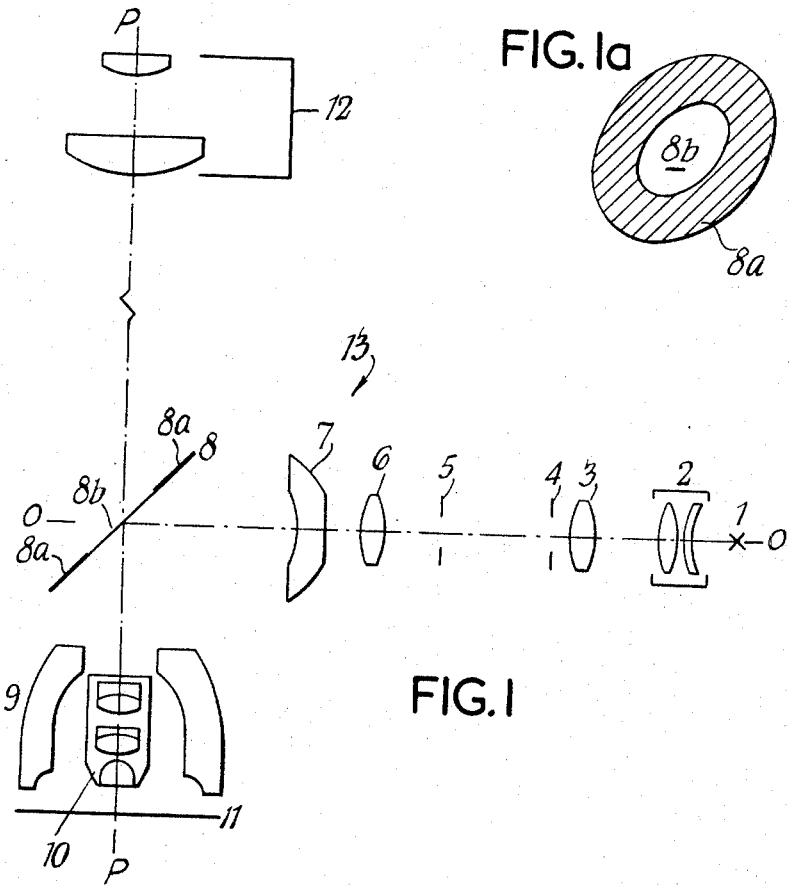
FIG. 1a
FIG. 1
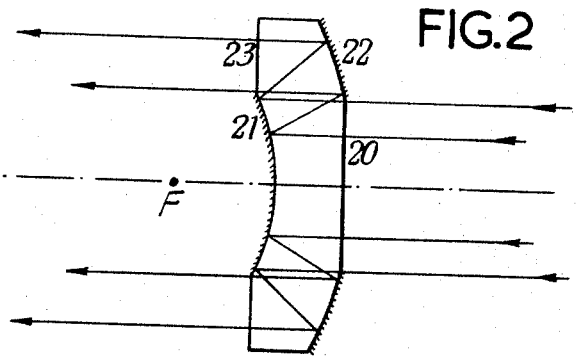
FIG. 2

MICROSCOPES INCORPORATING INCIDENT-LIGHT DARK GROUND ILLUMINATION SYSTEMS

This invention relates to incident-light dark ground illumination systems for microscopes.

A known microscope incorporating such a system comprises an objective, an eyepiece, a light source for producing a light beam directed towards the axis of the microscope between the objective and the eyepiece, a lens between the source and the axis for collimating the beam, a reflector, mounted between the objective and the eyepiece and formed with a partially reflecting area in its centre, for producing a reflected beam directed parallel to the optical axis of the microscope but in the direction from the eyepiece to the objective, and an annular condenser arranged coaxially with the objective for receiving the reflected beam and focusing it upon the object being viewed through the microscope. Light scattered or diffracted by the object is then allowed to enter the objective and is converged, through the transparent aperture in the reflector, to form an image which is viewed by means of the eyepiece.

For the proper functioning of this microscope it is necessary that the following three conditions be fulfilled: firstly, no light from the illumination system should pass in to the back of the objective; secondly, no light should reach the eyepiece except that which has passed but once through the objective, from the front to the back thereof; and thirdly, the respective sizes of all apertures along the optical axis of the microscope should be large enough to allow light from the objective to reach the whole of the field of view of the eyepiece.

In order to fulfil the third condition above, the diameter of the partially reflecting area of the reflector must be made larger as the field of view is made larger or as the distance between the objective and the reflector is increased.

If the second condition above is also to be fulfilled, the diameter of the annular condenser must be made so large that no part of its annular aperture is visible from any part of the field of view of the eyepiece, since otherwise light, internally reflected in the condenser or scattered from the object and through the condenser, may reach the eyepiece. Clearly the necessary diameter of the annular condenser becomes larger as the size of the partially reflecting area of the reflector increases: that is, as the field of view increases.

In addition, in order to fulfil the first condition, a diaphragm is provided between the reflector and the source to restrict the beam incident on the reflector so that none of the light reflected therefrom falls on the back face of the objective. The diaphragm is in the form of an opaque central stop surrounded by a clear annulus so that light incident on the reflector and reflected thereby, is of annular cross section. In this case, the necessary diameter of the opaque central stop of the diaphragm is determined by the distance from the diaphragm to the objective and by the diameter of the back aperture of the objective.

This known microscope is described on pages 65 to 67 of "Applied Optics and Optical Engineering," Volume IV, published by Academic Press in 1967.

If it is required to view a wider field, the partially reflecting area of the reflector must be made larger and if the second condition is still to be fulfilled the internal diameter of the annular condenser must be increased. This in turn requires that the internal diameter of the annular light beam be increased, and in order to avoid reducing the intensity of the illumination the external diameter of the annular light beam should also be increased. With the above-described microscope it is necessary in order to increase the external diameter of the annular light beam to replace the collimating lens between the light source and the axis of the microscope by a larger lens or lenses, leading to an increase in the bulk of the illumination system.

British Pat. No. 389,414 describes an incident-light dark ground illumination system in which the external diameter of the annular beam is increased with respect to the diameter of the beam from the collimating lens by means inter alia of an optical element having an inlet region, at one side of the element, for admitting light of a beam originating from the source and directed along an optical axis of the element towards the one side thereof, the element being formed so as to deflect light admitted by way of the inlet region and direct that light to leave the element at an opposite side thereof as an annular output beam. However, this optical element is of complex form and requires a complex auxiliary element upstream thereof to transform the beam from the collimating lens into suitable form for admission to the optical element. Accordingly it is desired to provide an incident-light dark ground illumination system which can provide an annular beam of increased diameter with respect to the beam from the collimating lens but using an optical element of simpler form and not requiring a complex auxiliary element.

According to the present invention there is provided an incident-light dark ground illumination system, for microscope, comprising an optical element which has an inlet region at one side thereof for admitting light of a given illuminating beam, directed towards that one side along an optical axis of the element, and also has a first reflecting surface arranged at an opposite side of the element to receive light admitted by way of the said inlet region and to reflect such received light towards a second reflecting surface of the element that surrounds the said inlet region at the said one side of the element and is so formed that it reflects such light received from the first reflecting surface so that the light leaves the element at the said opposite side thereof as an output beam surrounding the said first reflecting surface, the system also comprising a reflector device having a transparent central area, for transmitting light from an objective to an eyepiece of the microscope, which is surrounded by a non-transmitting peripheral reflecting area of the device arranged obliquely to the said output beam so as to produce therefrom a reflected beam, of annular cross-section, for delivery to an annular input face of an apertured condenser of the microscope when the system is in use.

For a better understanding of the invention, and to show how the same may be carried into effect, reference will now be made, by way of example, to the accompanying diagrammatic drawing in which:

FIG. 1 shows the optical layout of a microscope equipped with an incident-light dark ground illuminator FIG. 1a shows in plan the reflector of the illuminator, and FIG. 2 shows, on an enlarged scale, part of the illuminator.

The microscope shown in FIG. 1 comprises an eyepiece 12 and is equipped with an incident-light dark ground illuminator 13 which includes an objective 10 for co-operating with the eyepiece 12 for viewing an object in an object plane 11. The illuminator 13 also comprises a first field lens 3, two iris diaphragms 4 and 5 and a second field lens 6, all mounted on a common optical axis 0—0. The illuminator 13 is used with a lamp source 1 and a lamp condenser 2 arranged so that light from the source 1 is converged by the condenser 2 towards the diaphragm 4, and the field lens 3 re-images the condenser on to the diaphragm 5. The first focal point of the field lens 6 is at the diaphragm 5 so that the light beam leaving the lens 6 is substantially parallel.

The illuminator 13 further comprises an afocal catadioptric element 7, positioned on the axis 0—0 to receive the parallel light beam from the lens 6, a plane reflector 8, having a fully reflecting outer portion 8a and a transparent but semi-reflecting central portion 8b, and an annular condenser 9 which surrounds the objective 10 coaxially, the condenser 9, the objective 10 and the eyepiece 12 all lying on a common axis P—P which intersects the axis 0—0 at the centre of the portion 8b of the reflector. Preferably the illuminator, comprising the elements 3 to 10, is removable from the rest of the microscope so that it can be replaced by other accessories. Normally the objective 10 and the condenser 9 would be parts of an exchangeable nosepiece fitted removably to the rest of the illuminator. The annular condenser 9 is arranged so that light entering the upper face of the condenser 9 parallel to the optical axis of the microscope is converged towards the axis P—P where it meets the object plane 11, i.e., such light is converged towards the object.

Referring to FIG. 2, the parallel beam of light leaving the lens 6 enters the element 7 normally through an input face 20 thereof and is deflected by a spherically convex reflecting surface 21 towards a spherically concave reflecting surface 22 which reflects the light out of the element 7 normally through an output face 23. The respective curvatures of the reflecting surfaces 21 and 22 and the spacing of the poles of these surfaces along the axis 0—0 are such that the focal points F of the two surfaces 21 and 22 are coincident, so that the emergent beam from the element 7 is parallel. The emergent beam is of annular cross-section, the internal diameter of the annulus being determined by the diameter of the reflecting surface 21, while the external diameter of the annulus is related to the diameter of the input face 20. As can be seen from FIG. 2, the external diameter of the annulus is greater than the diameter of the entrant beam from the lens 6.

The emergent beam from the element 7 is reflected by the reflector 8 parallel to the optical axis of the microscope but in the direction from the eyepiece to the objective so that the annular beam enters the annular upper face of the condenser 9. The beam is converged towards the object in the plane 11 and light scattered from the object enters the microscope objective 10 and passes through the semi-reflecting central portion 8b to form a primary image which is viewed by means of the eyepiece.

If the element 7 is removed, the second field lens 6 forms an image of the diaphragm 4 close to the back of the microscope objective 10, by virtue of the fact that the central portion 8b of the reflector 8 is semi-reflecting rather than fully transparent, and in these circumstances the illuminator provides incident bright field illumination in which the area of the object viewed, and the aperture of the objective used, may be readily and independently controlled by means of the diaphragms 5 and 4 respectively. If only dark ground illumination is required, the illuminator shown in FIG. 1 may be simplified by the removal of the diaphragms 4 and 5 and the lenses 3 and 6 and by moving the lamp 1 and its condenser 2 close to the element 7. In addition, the central portion 8b of the reflector 8 need not be semi-reflecting but may be totally transparent.

By making the ratio of the aperture of the entrant beam of the element 7 to the aperture of the emergent beam thereof equal to the ratio of the focal length of the objective 10 to the focal length of the condenser 9, the same area of the object is illuminated for any single setting of the diaphragm 5 in either the bright field or the dark ground mode. The ratio of the apertures of the entrant and emergent beams of the element 7 is determined by the curvatures of the reflecting surfaces 21 and 22 of the element 7 and its axial thickness.

Alternatively, the surface curvatures and the thickness of the element 7 may be so chosen that element 7 is non-afocal and the diaphragm 4 is at the first focal point of the combination of the element 7 and the lens 6. In this case, with the iris diaphragm 5 opened wide, an image of the lamp 1 is formed close to the object plane 11, this being advantageous from the point of view of obtaining maximum illumination intensity at the object plane 11 and accordingly in some cases desirable, and furthermore the area of the object illuminated may be adjusted by adjusting the diameter of the aperture of the diaphragm 4. Clearly, if the element 7 is then removed to provide bright field illumination the illuminated area of the object may change, but the size of the illuminated area may still be adjusted by means of the diaphragm 5.

The diameters of the lenses 2, 3 and 6 shown in FIG. 1 are smaller than would be necessary to obtain the same external diameter for the annular beam falling on the reflector 8 without the use of the element 7. The reduction is by an amount approximately proportional to the ratio of the diameters of the entrant and emergent beams of the element 7.

I claim:

1. For use with a microscope having an eyepiece and equipped with an objective and an apertured condenser which has an annular input face and is arranged coaxially with the objective, an incident-light dark ground illumination system comprising an optical element which has an optical axis and is formed with an inlet region at one side of the element to admit light of a given illuminating beam directed towards that one side along said optical axis, and also has a first reflecting surface arranged at an opposite side of the element to receive light admitted by way of said inlet region, and a second reflecting surface arranged at said one side of the element and surrounding said inlet region to receive light of said given beam reflected from the first reflecting surface and to reflect such received light out of the element at said opposite side thereof as an output beam surrounding the first reflecting surface, and the system also comprising a reflector device having a transparent central area, for transmitting light from said objective to said eyepiece, and a non-transmitting peripheral reflecting area which surrounds said central area snd is mounted obliquely to said output beam to produce therefrom a reflected beam, of annular cross-section, for delivering to said annular input face.

2. An illumination system according to claim 1, wherein said first and second reflecting surfaces are cylindrically symmetrical about said optical axis, and the first reflecting surface is convex towards said inlet region and the second reflecting surface is concave towards the first reflecting surface.

3. An illumination system according to claim 2, wherein the first reflecting surface has a focal point and the second reflecting surface has a focal point which coincides with the focal point of the first reflecting surface.

4. An illumination system according to claim 1, further comprising a first iris diaphragm defining an aperture, on said optical axis, from which said given illuminating beam emanates, and a lens mounted between the aperture and the element at a position such that said output beam is collimated.

5. An illumination system according to claim 1, further comprising a first iris diaphragm defining an aperture, on said optical axis, from which said given illuminating beam emanates, a lens mounted between the aperture and the element at a position such that said output beam is collimated, and a second iris diaphragm defining an aperture, on said optical axis, between the first diaphragm and the lens.

6. An illumination system according to claim 1, further comprising a first iris diaphragm defining an aperture, on said optical axis, from which said given illuminating beam emanates, a lens mounted between the aperture and the element at a position such that said output beam is collimated, a second iris diaphragm defining an aperture, on said optical axis, upstream of the first iris diaphragm, and a field lens mounted adjacent to said second iris diaphragm for converging light from an image of a source formed at the second iris diaphragm towards the first iris diaphragm.

7. An illumination system according to claim 1, wherein said optical element is mounted so as to be removable from the illumination system.

8. An illumination system according to claim 1, wherein said central area of the reflector device is partially reflecting.

9. An illumination system according to claim 1, wherein said central area of the reflector device is totally transparent.

10. An illumination system according to claim 1, in combination with a lamp and a lamp condenser mounted between the lamp and said optical element for providing said given illuminating beam.

11. An illumination system according to claim 1, further comprising such an apertured condenser mounted in the system so as to receive said reflected beam coaxially upon its annular input face, and such a microscope objective mounted in the aperture of the condenser with its back towards the reflector device so that the condenser surrounds it coaxially and substantially none of the light of the said reflected beam enters the objective through the back thereof.

12. An illumination system according to claim 11, wherein said first and second reflecting surfaces are cylindrically symmetrical about said optical axis, the first reflecting surface has a focal point and is convex towards said inlet region, the second reflecting surface, being concave towards said first reflecting surface, has a focal point which coincides with that of said first reflecting surface and the ratio of the aperture of said given beam to the aperture of said output beam is equal to the ratio of the focal length of said objective to the focal length of said condenser.

13. An illumination system according to claim 11, wherein said condenser and said microscope objective are mounted so as to be removable from the illumination system.

14. A microscope comprising an eyepiece and equipped with an illumination system as claimed in claim 11, the illumination system being so mounted with respect to the rest of the microscope as to be removable therefrom.

* * * * *